United States Patent [19]
Schuette

[11] 3,815,582

[45] June 11, 1974

[54] MODULATED SINE WAVE FLOWMETER

[75] Inventor: William H. Schuette, McLean, Va.

[73] Assignee: The United States of America as represented by the Secretary of Health, Education and Welfare, Washington, D.C.

[22] Filed: Mar. 23, 1972

[21] Appl. No.: 237,262

[52] U.S. Cl.......................... 128/2.05 F, 73/194 EM
[51] Int. Cl............................................... A61b 5/02
[58] Field of Search ............ 128/2.05 F; 73/194 EM

[56] References Cited
UNITED STATES PATENTS

| | | | |
|---|---|---|---|
| 2,808,723 | 10/1957 | Buntenbach | 73/194 EM |
| 3,184,966 | 5/1965 | Thornton et al. | 73/194 EM |
| 3,316,762 | 5/1967 | Westersten | 73/194 EM |
| 3,449,951 | 6/1969 | Westersten | 73/194 EM |

OTHER PUBLICATIONS

"I.R.E Trans. on Med. Electronics," Dec. 1959, pp. 220–228.

"I.R.E. Trans. on Med. Electronics," Dec. 1959, Pp. 232–234.

"Med. & Biol. Engng.," Vol. 7, pp. 549–558, 1969.

"Med. & Biol. Engng.," Vol. 9, Pp. 563–565, 1971.

*Primary Examiner*—Kyle L. Howell

[57] ABSTRACT

A gated electromagnetic sine wave flowmeter determines flow velocity of an ionizable solution whereby the unwanted quadrature signal, obtained during the maximum rate of change of the magnetic field, is gated out. Accurate gating is accomplished by modulation of the magnet drive amplitude during zero flow condition and adjusting the gate phase control until the effects of the modulated quadrature signal is nulled out.

6 Claims, 2 Drawing Figures

3,815,582

MODULATED SINE WAVE FLOWMETER

BACKGROUND OF THE INVENTION

The present invention relates to an electromagnetic flowmeter, and, more particularly, to an electromagnetic flowmeter for ionizable solutions such as blood wherein undesirable quadrature signals are phased, or gated, out of the signal channel by amplitude modulation to thereby improve the reading as to the amount of flow.

There is an ever-growing interest in the determination of the rate of blood flow through unopened blood vessels in conscious mammals. This interest extends beyond the interest in hemodynamics and offers potentialities in providing a general index to the activity of a variety of organs of the body. For example, the rate of blood supply to an organ is the determining factor in the regulation of the supply of oxygen, hormones and nutrient materials as well as determining the rate of removal of metabolic products. The blood flowing through an undisturbed organ, when correlated with its rate of activity, could thus be used to follow variations in the organ's activity in response to a variety of stimuli and inhibiting factors.

It was discovered a number of years ago that the continuous recording of blood flow through blood vessels can be accomplished by the measurment of the electromotive force induced in the blood flowing transverse to an electromagnetic field. In the case of a circular conduit, similar to an artery, and axially symmetrical flow, the induced E.M.F. is a linear function of the average fluid discharge. In the case where the conduit is itself conductive, it is possible, particularly in the case of blood vessels, to detect flow signals by establishing electrical contact with two points on the outside wall of the conduit, preferably at opposite ends of a diameter perpendicular to the magnetic field.

Employing this principle, a number of flowmeters have been designed for extra-corporeal or implanted measurement of blood flow. Basically, these prior flowmeters include a plastic body having a cylindrical opening or lumen corresponding in size to the outside diameter of a blood vessel to be monitored. The sleeve is normally slotted, or hinged, to allow the insertion of the vessel into the lumen. The sleeve normally carries a pair of metal electrodes embedded in the plastic wall at diametrically opposite positions to sense the electrical potential developed across the vessel by fluid flow in the presence of a transverse magnetic field. This field can be produced between a pair of iron pole pieces embedded in the plastic body and defining an airgap across the blood vessel in an otherwise closed magnetic circuit. This type of flow sensor is known as the core type and is particularly useful in measurement of flow in small blood vessels. The magnetic core flow sensor provides a high sensitivity because of the relatively high magnetic field strength obtained, but has the disadvantage of great bulk occupied by the iron, in addition to the space filled by copper and encasing plastic material.

Blood flow is also measured by placing a mean velocity transducer in an artery having a known cross-sectional area, and blood flow is the product of the mean velocity and area. A device which requires that the blood vessel be opened and a foreign body inserted therein has obvious deficiencies.

The theory of electromagnetic flowmeters in general is based on Faraday's Law. When a conductive fluid, such as blood, traverses the lines of force of a magnetic field, an electromotive force is generated in the fluid which is perpendicular to both the magnetic lines of force and the direction of motion of the fluid. This electromotive force is directly proportional to the intensity of the magnetic field, the distance between the sensing electrodes and the fluid velocity.

The maximum flow signal is obtained at the peaks of the magnetic field, and an additional signal, one that is undesirable and often referred to as a quadrature signal, is obtained during the maximum rate of change of the magnetic field. This quadrature signal is a combination of inductively and capacitively coupled signals primarily coming from the transducer and its cabling, and thus function to distort the true flow signals and produce inaccurate readings.

SUMMARY OF THE INVENTION

It is an object of this invention to effectively remove unwanted quadrature signal and thereby improve electromagnetic flow probes.

Another object of the invention is to overcome the deficiencies of the prior art, such as indicated above.

Another object of the present invention is the provision of an improved electromagnetic flowmeter.

Another object is the provision of an electromagnetic flowmeter which nulls out the unwanted quadrature signal.

Still another object is the provision of a flowmeter which amplitude modulates the magnet drive voltage.

Yet another object is the provision of a flowmeter wherein adjustment of the gate position produces a null of the modulation signal at the demodulator output.

Still another object is the provision of a flowmeter wherein the adjustment of the gate is accomplished during a zero flow situation.

Thus, an important purpose of the present invention is to eliminate the unwanted quadrature signal in an electromagnetic flowmeter and thereby improve its accuracy by carefully gating the magnet amplitude drive during zero flow condition so that the quadrature signal is nulled out. The flow signal and the unwanted quadrature signal are combined when presented to a synchronous demodulator for separation. When the electronic gates in the demodulator are positioned or phased correctly, almost perfect artififact or quadrature signal rejection is obtained. The invention permits the accurate location of the gate pulses for maximum artifact rejection; this is accomplished by amplitude modulation of the magnet drive voltage at a low rate, e.g., 1 percent of the carrier frequency, and at the same time adjusting the gate position until a null of the modulation signal is observed in the demodulator output. This adjustment must be accomplished during a zero flow situation with some quadrature signal present.

Other objects and many of the attendant advantages of this invention will be readily appreciated as the same becomes better understood by reference to the following detailed description when considered in connection with the accompanying drawing in which like characters designate like parts throughout the FIGS. thereof and wherein:

DETAILED DESCRIPTION OF EMBODIMENT

Figure 1:
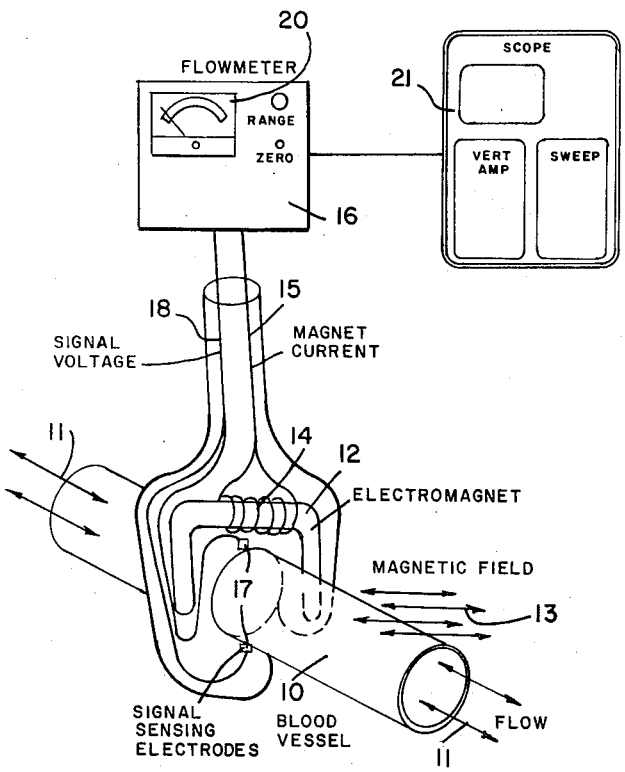
FIG. 1 shows the structure of a typical electromagnetic flowmeter.

Referring now to the drawing, there is shown in FIG. 1, which depicts a typical example of an electronic flowmeter, a cylindrical vessel 10 carrying an ionizable solution, and in this case the vessel 10 is a blood vessel carrying a flow of blood in a living mammal, along the longitudinal axis of the vessel in the direction of the arrows 11. Positioned on at least two sides of vessel 10 is an electromagnet 12, the magnet core being made of suitable magnetic material such as iron and customarily of laminated sheets fastened together, and being substantially U-shaped in configuration to provide an airgap between the two arms of the core. When in operating position, the blood vessel 10 is located in this airgap, between the arms of the magnet, so that a magnetic field 13 is impressed on the blood vessel transversely to the direction of blood flow 11.

An electric coil 14 to drive the magnet is wound about the horizontal leg of the iron core, potential for the coil being supplied via leads 15 from a control cabinet 16. Diametrically opposite on either side of blood vessel 10 there are positioned a pair of signal sensing electrodes 17, these electrodes being connected to the control cabinet 16 by means of wires 18. When the electromagnetic flowmeter of FIG. 1 is in operation induced E.M.F. caused by fluid flowing through the magnetic field is picked up by electrodes 17 and fed to the control cabinet 16 where it is displayed, as rate of flow, on a meter 20, and/or displayed as a waveform on an oscilloscope 21.

Figure 2:
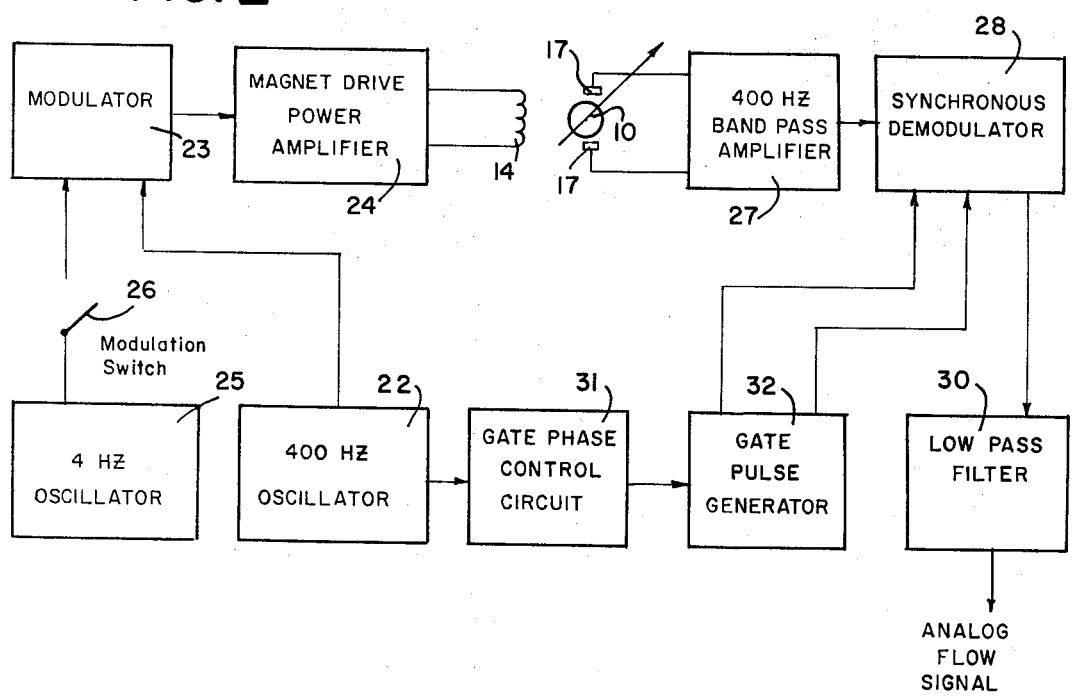
FIG. 2 shows a block diagram of the components making up the invention.

Turning now to the block diagram of FIG. 2, which gives the manner in which various components of the invention are connected, there is schematically shown a blood vessel 10 whose blood flow is being measured, the direction of flow being perpendicular to the plane of the paper. For simplicity of presentation the U-shaped iron core of the electromagnet flowmeter is not shown in FIG. 2 but it is understood that blood vessle 10 is positioned in the airgap of such a magnet.

An oscillator, operating on the order of 400HZ, is shown at 22, the output of the oscillator furnishing one input to a modulator 23, the output of modulator 23 in turn being fed to a magnet drive power amplifier 24 which is utilized to energize the magnet coil 14. A second input for modulator 23 is supplied by a second oscillator 25, this oscillator operating on the order of about 1 percent of the carrier frequency supplied by the first oscillator 22; successful operation has been provided using either a 4HZ oscillator or a 1HZ square wave oscillator. An off-on switch 26 connects the oscillator 25 to the modulator 23 where desired.

The signal sensing electrodes 17, placed on opposite sides of blood vessel 10, sense the E.M.F. induced by the blood flowing through the magnetic field and apply this signal as input to a 400 HZ band pass amplifier 27, the output of this amplifier in turn being applied to a synchronous demodulator 28 before going to a low pass filter 30. The output of low pass filter 30 is an analog flow signal indicative of the blood flow through the blood vessel under observation. If desired, the amplifier 27 may be preceded by a suitably isolated pre-amplifier (not shown).

A second output from 400 HZ oscillator 22 is connected to a gate phase control circuit 31, the signal from which is applied to a gate pulse generator 32. The gate pulse generator 32 produces two output signals, both of which are connected as additional inputs to the synchronous demodulator 28.

The operation of the modulated gated sinewave flowmeter of the present invention is as follows. A 400 HZ sinewave signal from the oscillator 22 is passed through the modulator 23 and the magnet drive power amplifier 24 to energize the magnet coil 14 of the electromagnetic flowmeter transducer and thereby impress a magnetic field transversely across the blood vessel 10 which has blood flowing therethrough. The induced E.M.F. caused by the blood flow is sensed by the electrodes 17 and the resulting signal is passed through the 400 HZ band pass amplifier 27, the synchronous demodulator 28, the low pass filter 30 and out to some visual display device such as an analog flow signal to indicate the blood flow through the vessel.

As stated above, the theory of electromagnetic flowmeters is based on Faraday's Law, and when a conductive fluid traverses the lines of force of a magnetic field, an electromotive force is generated in the fluid which is perpendicular to both the magnetic lines of force and the direction of motion of the fluid. This electromotive force is directly proportional to the intensity of the magnetic field, the distance between sensing electrodes and the fluid velocity. The maximum flow signal is obtained at the peaks of the magnetic field, and at the same time an additional unwanted signal, in quadrature with the other signals, is obtained during the maximum rate of change of the magnetic field. This quadrature signal is a combination of inductively and capacitively coupled signals primarily coming from the transducer and its cabling, and should be eliminated for improved accuracy of flowmeter readings.

To obtain this elimination of the quadrature signal, the modulation switch 26 is now closed to impress the output of oscillator 25 onto modulator 23 resulting in amplitude modulation of the magnet drive voltage produced by power amplifier 24 and suppled to coil 14. At the same time, the gate pulse generator 32 is adjusted to modify the gate position until there is a null in the modulation signal at the output of demodulator 28. It should be noted that this adjustment must be accomplished during a zero flow situation. To obtain zero flow, the flowmeter may be attached to the aorta of the heart where, for a fraction of a second, there is no blood flow as the heart fills, or in the alternative, blood flow may be occluded by manually blocking a vessel. When the electronic gates in the demodulator 28 are positioned correctly, through adjustment of pulse gate generator 32, almost perfect artifact (quadrature signal) rejection may be obtained at the output of the demodulator, and therefore at the output of the system.

From the above description of the structure and operation of the invention it is obvious that the modulated gated sinewave flowmeter disclosed offers many improvements and advancements over the shortcomings and weaknesses of similar prior art devices. The invention thus provides an inexpensive, accurate, and easy to use flowmeter which eliminates unwanted, spurious signals that normally distort true readings of blood flow.

Obviously many modifications and variations of the present invention are possible in the light of the above teachings. It is therefore to be understood that within the scope of the appended claims and equivalents, the invention may be practiced otherwise than as specifically described.

What is claimed is:

1. A modulated sine wave flowmeter for measuring, as induced E.M.F., the rate of flow of blood in a blood vessel, and eliminating unwanted quadrature signals, comprising:

an electromagnet adapted for partially encircling the blood vessel, said electromagnet generating a magnetic field on the blood vessel transversely to the direction of flow;

a pair of signal sensing means positioned adjacent said electromagnet and adapted for location diametrically opposite one another on either side of the blood vessel for detecting a first signal, said first signal corresponding to the induced E.M.F. caused by the flow of blood through said magnetic field, and for detecting a second signal, said second signal being in quadrature with said first signal;

an electric coil wound about said electromagnet for driving said electromagnet;

coil energizing means electrically connected to said coil for producing a drive voltage for energizing said coil;

a modulator electrically connected to said coil energizing means;

a first oscillation means electrically connected to said modulator for supplying a sine wave to said modulator at a first frequency for the energization thereof;

a second oscillation means to modulate the amplitude of the voltage of said coil energizing means and thereby modulating said second signal, said second ocillation means operating at a second frequency which is a fraction of said first frequency, said second oscillation means including means for electrically connecting and disconnecting said second oscillation means to said modulator;

demodulation means electrically connected to said sensing means for separating said first and second signals, said demodulation means including adjustable electronic gates;

gate pulse generating means for adjustably modifying the position of said electronic gates during zero blood flood to null said second signal; and readout means connected to the output of said demodulation means.

2. The device of claim 1 wherein said readout means comprises means for visually displaying said first and second signals.

3. The device of claim 1 wherein said pair of signal sensing means are electrodes.

4. The device of claim 2 wherein said means for visually displaying said signals is a meter.

5. The device of claim 2 wherein said means for visually displaying said signals is an oscilloscope.

6. The device of claim 1 wherein said coil energizing means is a power amplifier.

* * * * *